Oct. 16, 1928.  
J. F. RALEIGH  
1,687,734  
THEFT PREVENTING DEVICE  
Original Filed Jan. 9, 1925
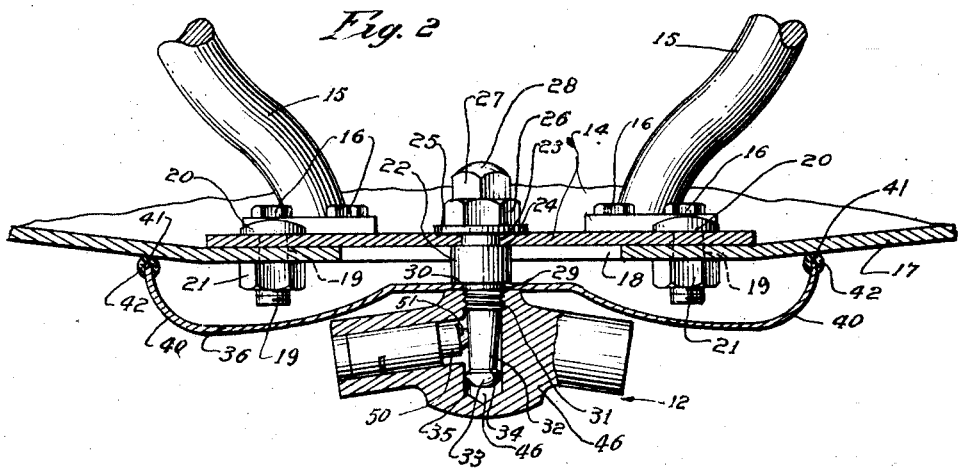
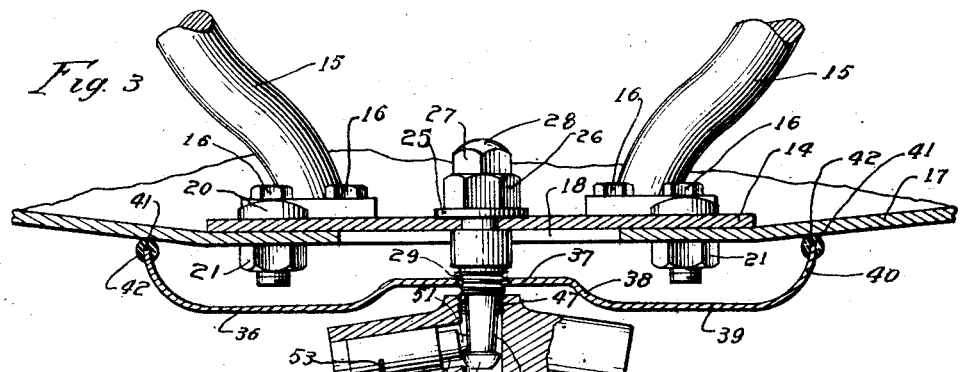
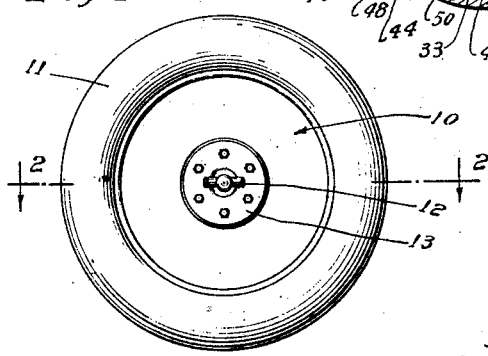
Inventor:  
James F. Raleigh  
By: Williams, Bradbury,  
McCaleb & Hinkle  
Attys.

Patented Oct. 16, 1928.

1,687,734

UNITED STATES PATENT OFFICE.

JAMES F. RALEIGH, OF CHICAGO, ILLINOIS, ASSIGNOR TO PINES WINTERFRONT COMPANY, OF CHICAGO, ILLINOIS, A CORPORATION OF DELAWARE.

THEFT-PREVENTING DEVICE.

Original application filed January 9, 1925, Serial No. 1,444. Divided and this application filed April 27, 1927. Serial No. 186,932.

The present invention relates to theft preventing devices, and is more particularly concerned with locking devices for spare wheels for automobiles.

The present application is a division of my application Serial No. 1,444 for locking devices, filed January 9, 1925, which resulted in Patent No. 1,628,740, issued May 17, 1927.

One of the objects of my invention is the provision of a novel theft preventing tire carrier assembly including an improved locking device which is adapted to lock a spare wheel upon a carrier and which when in locked condition may be freely rotated upon its support without substantial resistance so that the lock cannot be broken by the application of a powerful leverage to the lock for rotating the same.

Another object of my invention is the provision of a theft preventing tire carrier assembly including a lock of the class described and resilient means for enclosing certain of the detachable fasteners for said wheel and for preventing rattling between said elements.

Another object of my invention is the provision of a novel tire carrier assembly including a locking post for passing through a spare wheel, a plurality of detachable fasteners for supporting the spare wheel upon the carrier, a shield upon said post for rendering said detachable fasteners inaccessible and locking means carried by said post for locking said shield in said locking position.

Other objects and advantages of my invention will appear more fully from the following detailed description of a preferred embodiment of my invention and from the drawings in which similar characters of reference indicate similar parts throughout the several views.

Referring to the drawings, Figure 1 is a vertical elevation of a tire carrier equipped with my theft preventing device.

Figure 2 is a cross sectional view on the line 2—2 of Figure 1, with the device in locked position.

Figure 3 is a similar view with the device locked but partially unscrewed.

Referring to Figure 1, 10 indicates a spare wheel with a tire 11 which is shown in position upon the tire carrier, being locked by the locking device 12 in combination with the resilient shield 13. The spare wheel mounting bracket shown in Figures 2 and 3 is intended as a representative type of spare wheel mounting to which my locking device may be applied. The mounting bracket may include a sheet metal plate 14 which is permanently supported upon some part of the car body by a plurality of supporting arms 15 to which the plate may be affixed by a plurality of rivets 16 or other convenient fastening means.

17 indicates a fragmentary portion of the conventional disk wheel 10 having a central aperture 18 adapted to receive the hub of the wheel and a plurality of bolt apertures 19 by which the wheel may be secured upon the hub. The mounting plate 14 may likewise be provided with a plurality of stud bolts 20, which are adapted to be received in the apertures 19 of the wheel 17 when the wheel is mounted upon the plate 14. The bolts 20 are provided with a plurality of nuts 21 which are adapted to firmly support the disk wheel upon the mounting plate 14. The stud bolts 20 are preferably riveted or otherwise suitably anchored to the mounting plate 14.

Extending centrally from the mounting plate 14 is a mounting stud 22 having a reduced portion 23 forming an annular shoulder 24 bearing against the outer side of the mounting plate 14. The reduced portion 23 may be threaded at its end and the stud 22 may be secured to the mounting plate 14 by a suitable washer 25, a nut 26, a lock nut 27, and by riveting over the extreme end 28. The opposite end of the stud or post 22 may likewise be reduced in size as at 29, thereby forming a second annular shoulder 30 and the reduced portion may be threaded as at 31. The reduced portion 29 may be tapered as at 32 having a head 33 formed at its end with an annular shoulder 34, the head being preferably tapered or rounded off as at 35, to form a camming surface for a locking bolt further to be described.

The locking stud 32 is adapted to receive the resilient shield or cover plate 36 which is adapted to fit over the stud bolts 20 with their nuts 21 bearing against the disk 17 of the wheel, thereby rendering the stud bolts inaccessible and preventing removal of the wheel. The shield 36 is preferably of substantially circular form, having a central flat portion 37, an outwardly turned annular flange 38, an annular flat portion 39, and an inwardly turned annular flange 40.

The outwardly turned flange 38 enables the use of a shorter mounting stud 32 and renders the shield 36 more resilient. The extreme edge of the outer flange 41 is preferably covered with means for protecting the disk wheel 17 comprising a resilient facing bead 42, which may consist of a slotted strip of rubber. This resilient edging strip not only prevents the marring of the surface of the disk wheel, but it also prevents the stud bolts 20 and their nuts 21 from being covered with mud or the like, which might render the bolts difficult to unfasten, or which might cause the presence of rust. The shield 36 is adapted to contact with the disk 17 at its upper edge before the inner flat surface 37 strikes the annular shoulder 30 of the mounting stud 32, as shown in Figure 3, but when the device is in locked and clamping position the shield 36 is flexed inward, as shown in Figure 2. The outer edge 41 of the shield 36 then bears against the disk wheel 17 and tends to prevent rattling between the other parts of the wheel, carrier, and the lock further to be described. The resilient shield 36 also acts as a lock washer for preventing rattling or loosening of the outer locking device 43, which I shall now describe.

The locking device 43 may consist of a metal casing member having one or more outwardly extending arms 44 and 45 and a central bore 46 and the bore 46 may be threaded at its inner end 47 and the bore 46 and thread are adapted to pass the head 33 of the locking stud. One of the arms 44 may be provided with a bore 48 which is adapted to intersect the bore 46 at a point spaced from the threaded portion 47 and the bore 48 may be provided with a locking barrel 49.

In the embodiment shown the locking barrel 49 includes a pin tumbler lock, although it will be understood that I may use a combination lock if desired. The tumbler barrel shown is of the type including a spring actuated locking bolt 50 which may be pressed inward by the engagement of the head 33 upon the tapered end 51 of the locking bolt and the locking bolt may also be actuated by the rotation of a key within the locking barrel 49. As shown the locking barrel 49 is rotatable and is retained in the bore 48 by a pin 52 engaging in an annular slot 53.

The relative length of the locking stud 32 above the threaded portion 31, and the location of the locking bolt 51 is such that the casing 43 is completely screwed off the threads 31 before the locking bolt 50 engages the annular shoulder 34 on the head 33. It will thus be observed that the threads on the casing 43 and the locking stud 32 cannot be used to co-act against the locking bolt 50 and head 33.

The operation of the locking device shown is as follows: When the disk 17 is mounted by means of the stud bolts 20 the shield 36 may be placed upon the locking stud 32 covering the stud bolts 20, after which the lock casing 43 may be placed over the head 33 on the locking stud. The locking bolt 50 will be cammed backward by the head 33 snapping behind said head and retaining the locking device upon the stud 32. The locking device 43 may then be threaded upon the threads 31 engaging the resilient shield 36 and forcing it against the annular shoulder 30. The shield 36 will then be flexed, its outer edge bearing firmly against the disk wheel 17, and its inner portion acting as a lock washer against the locking device 43.

The other details of the locking mechanism are fully disclosed in my prior application above mentioned, and while the resilient shield 36 is preferably employed with such a locking mechanism, its use is not limited thereto, and it may be employed with many different types of locking devices.

It will thus be observed that I have invented a novel spare wheel carrier assembly including resilient means for enclosing and rendering inaccessible the bolts or other fastening means which support the wheel, and for preventing rattling between the locking device and other parts of the carrier assembly. It will be observed that although the nuts 21 upon the stud bolts 20 may become loose the locking device 43 and resilient shield 36 are adapted to hold the disk wheel without rattling and to prevent the loss of the nuts 21 from the carrier assembly.

While I have illustrated and described a specific embodiment of my invention, many modifications may be made without departing from the spirit of the invention, and I do not wish to be limited to the precise details set forth, but desire to avail myself of all changes within the scope of the appended claims.

Having thus described my invention, what I claim as new and desire to secure by Letters Patent of the United States is:

1. In a spare wheel carrier, the combination of a mounting bracket, means for securing a spare wheel on said mounting bracket, a resilient shield for covering said securing means, and means for locking said shield and wheel including a member passing through said wheel and shield, and a locking device carried by said member and flexing said shield against said wheel.

2. In a spare wheel carrier, the combination of a mounting bracket, means for securing a spare wheel on said mounting bracket, a resilient shield for covering said securing means, means for locking said shield and wheel including a member passing through said wheel and shield, and a locking device carried by said member and flexing said shield against said wheel, and an edging of protective material upon the edge of said shield, abutting said wheel.

3. In a spare wheel mount, the combination of a mounting bracket, stud bolts projecting from said mounting bracket for receiving the spare wheel, and a cover plate for enclosing the ends of said stud bolts, said cover plate having a pliable facing member secured to its edge for contacting with the side of the wheel.

4. In a spare wheel mount, the combination of a mounting bracket, stud bolts projecting from said mounting bracket for engaging in holes in a disk wheel, a cover plate for fitting over the outer ends of said stud bolts, a central stud passing through an aperture in said cover plate, means on said central stud for pressing said cover plate against the side of said disk wheel, and a slotted strip of rubber embracing the edge of said cover plate for contacting with the side of said disk wheel.

In witness whereof, I hereunto subscribe my name this 22d day of April, 1927.

JAMES F. RALEIGH.